June 28, 1966 J. E. WRIGHT ETAL 3,258,607

LOGIC BUILDING BLOCK WITH REDUNDANCY PROVISIONS

Filed April 30, 1963 2 Sheets-Sheet 1

INVENTORS
JAMES E. WRIGHT
WALLACE W. LINDEMANN
BY WILLIAM R. KEYE
Cushman, Darby & Cushman
ATTORNEYS June 28, 1966 J. E. WRIGHT ETAL 3,258,607

LOGIC BUILDING BLOCK WITH REDUNDANCY PROVISIONS

Filed April 30, 1963 2 Sheets-Sheet 2

INVENTORS
JAMES E. WRIGHT
WALLACE W. LINDEMANN
BY WILLIAM R. KEYE
Cushman, Darby & Cushman
ATTORNEYS United States Patent Office 3,258,607

Patented June 28, 1966

3,258,607

LOGIC BUILDING BLOCK WITH REDUNDANCY PROVISIONS

James E. Wright, Mound, Wallace W. Lindemann, Minneapolis, and William R. Keye, St. Paul, Minn., assignors to Control Data Corporation, Minneapolis, Minn., a corporation of Minnesota Filed Apr. 30, 1963, Ser. No. 276,707
3 Claims. (Cl. 307—88.5)

This invention relates to logic circuitry for use in digital computers and more particularly to a logical building block with redundancy provisions.

With the increasing employment of digital computers, greater emphasis is being placed on the design of machines having provisions for continuous unattended use for longer and longer periods. One means of accomplishing this desired objective is by the use of redundant circuitry within the computer. This arrangement provides parallel paths for information such that the failure of one of the paths does not interrupt the operation of the machine since the information will by-pass this failure over the parallel path.

One study has shown that a good piece of equipment without redundancy provisions may be continuously operated for approximately 200 hours, whereas the machine with redundant circuitry has a 98% probability of operating at least 10,000 hours. The performance of the machine with redundancy renders such equipment suitable even for use in aero-space computer applications where unattended operation over periods exceeding 10,000 hours with an assurance of over 90% is not an uncommon requirement.

It is also well known that by far the greatest percentage of failures occurring in logical circuitry in occasioned by open circuits rather than by short circuits. Therefore, the invention is directed to a circuitry arrangement for preventing the interruption of the computer due to open circuits.

In this invention an electrical logic circuit is constructed in such a manner that the components or individual circuits most likely to fail are supplemented by other components or circuits so that in case of a failure creating an open circuit, auxiliary components or circuits will carry on, and the logical function of the circuit as a whole will not be impaired.

Another object of the invention is to provide logic circuitry with redundancy provisions which is designed in such a manner that failures may easily be detected by a logical function test.

A further purpose of the invention is to construct a logic circuit which is physically and electrically arranged to permit repair of the defective portion of the circuit while the circuit as a whole is still in operation.

Additional objects are to provide a logic circuit with redundancy provisions having a reduced number of components and having simplified testing facilities.

These and other objects and the entire scope of the invention will become more fully apparent when considered in the light of the following detailed description of illustrative embodiments of this invention and from the appended claims:

The illustrative embodiments may be best understood by reference to the accompanying drawings, wherein.

The invention comprises a logical building block for use in digital computers which is provided with double level logic. This arrangement provides a redundant path whereby a failure of components creating open circuits in one of the paths does not interrupt operation of the computer logic. The invention further provides for rapid testing of each of the redundant paths to determine whether it is faulty.

Figure 1:
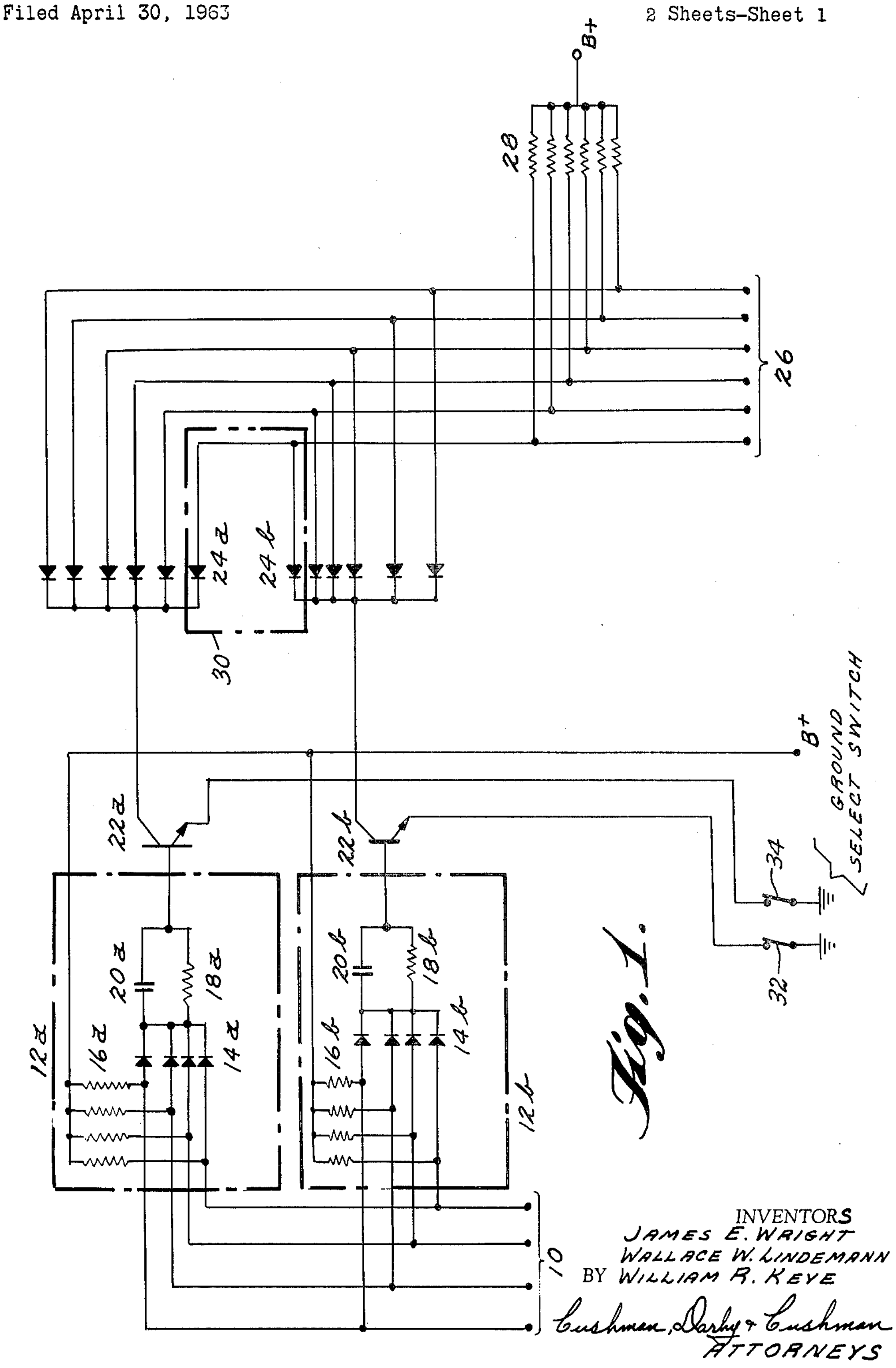
FIGURE 1 is a schematic diagram of the basic logical building block.

Referring to FIGURE 1, the structure of the logical building block may be described. To a plurality of input terminals 10 a pair of OR circuits, indicated by blocks 12*a* and 12*b*, are connected. In the embodiment disclosed, these OR circuits are of the Positive OR type since the logical "0" and "1" are both of positive potential with respect to ground, the logical "1" being more positive than the "0." These OR circuits comprise a plurality of diodes 14*a* and 14*b* the anodes of which are connected to the input terminals 10 such that one diode of each of the groups 14*a* and 14*b* is connected to each of the input terminals. Accordingly, a signal applied to any input terminal is directed to both of the OR circuits 12*a* and 12*b*. The cathodes of diodes 14*a* are connected together as are the cathodes of diodes 14*b*. To the anodes of each of the diodes 14*a* and 14*b* there is applied a positive voltage supply B+ through resistors 16*a* and 16*b* respectively. The common cathode connection of diodes 14*a* is connected to a resistor 18*a* and a condenser 20*a* joined in parallel, these being connected at their opposite ends to the base of a NPN type transistor 22*a*. Similarly, the cathodes of diodes 14*b* are joined through the parallel arrangement of resistor 18*b* and condenser 20*b* to the base of a NPN type transistor 22*b*. These transistors serve as inverters. The emitters of each of these transistors are selectively connected to the ground through a switch (not shown) which may connect either, or both, of the transistors to ground. The collector of transistor 22*a* is joined to a common cathode connection of a plurality of diodes 24*a*. The anodes of these diodes are brought out to output terminals 26. Similarly, the collector of transistor 22*b* is connected to the common cathode junction of diodes 24*b*. The anodes of diodes 24*b* are also connected to output terminals 26 such that each of the output terminals is joined to one anode of diodes 24*b*. Although six output terminals are shown, it will be understood that any number may be utilized consistent with the parameters of the overall circuit. The anodes of diodes 24*a* and 24*b* are suitably biased by the positive voltage source B+ through resistors 28. By such an arrangement, the combinations of diodes 24*a* and diodes 24*b* having common anode connections produce a plurality of positive AND circuits one of which is indicated by block 30.

Figure 2:
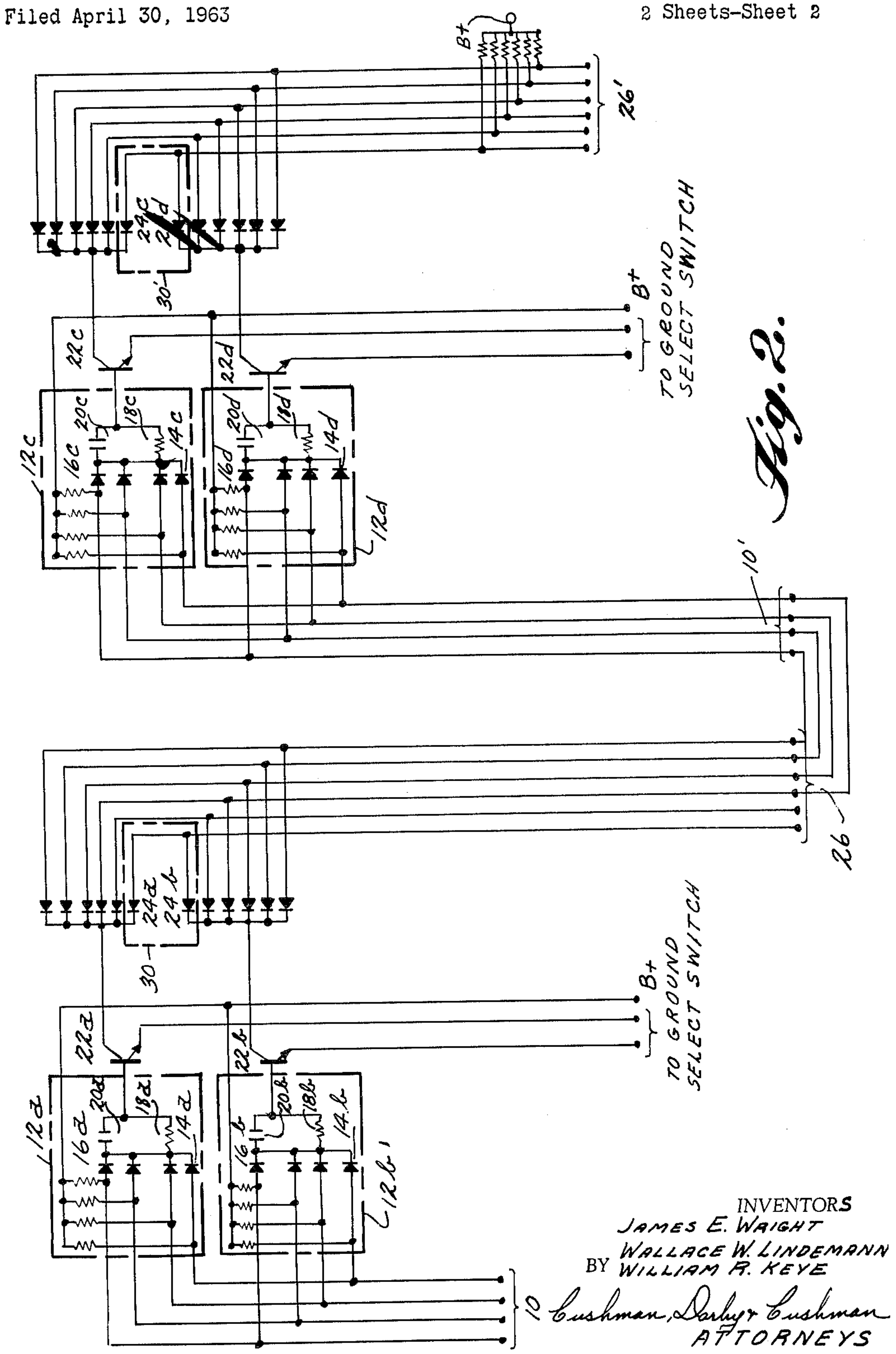
FIGURE 2 is a schematic diagram of a combination of two building blocks of FIGURE 1 in an illustrative configuration.

With the structure of the logic block set forth, the operation thereof will now be described. In FIGURE 2 there is illustrated a pair of these building blocks connected in series, four of the output terminals 26 of the first logical block being joined to the input terminals 10' of the second block. It should here be noted that with the two logic blocks connected in series, the biasing of the AND gates 30 from a positive source through resistors 28 may be eliminated as the biasing arrangement for the OR circuits 12*c* and 12*d* serves to provide the required biasing for AND gates 30.

Utilizing an arrangement as shown, the entire circuit performs a function which is simply that of double inversion of an input signal to terminals 10. It will be understood that this circuitry design has been illustrated for convenience in explaining the operation of the single logic block within a system rather than being directed to the usefulness of a double inverting circuit. The importance of the invention resides in the single logic block which is basically a single inverter.

With no inputs at terminals 10, the diodes 14*a* and 14*b* are forward biased. A direct current flow passes from the positive source B+ through resistors 16*a*, diodes 14*a*, resistor 18*a* and the emitter-base circuit of transistor 22*a* to ground. This produces a positive voltage at the base of transistor 22*a* driving it into conduction. As transistor 22*a* begins to conduct, its collector potential falls thereby forward biasing diodes 24*a*. Since the conducting transistor 22*a* and the forward biased diodes 24*a* are essentially short circuits, the potential at the anodes of diodes 24*a* is approximately ground potential. By the same reasoning, the anodes of diodes 24*b* are also at approximately ground potential. Therefore, none of the AND gates 30 are conditioned, and there is not output at output terminals 26.

Since four of the output terminals 26 are connected to the four input terminals 10′ of the second logic block, a direct path to ground is presented to current flowing from the positive source through resistors 16*c*, dodes 24*a* and 24*b* and transistors 22*a* and 22*b* to ground. Accordingly, the diodes 14*c* and 14*d* are reverse biased and the potentials at the bases of transistors 22*c* and 22*d* are low. This maintains the transistors in a cut-off condition and keeps their collectors at a high potential whereby the AND gates 30′ are conditioned to produce positive outputs at terminals 26′.

The operation of the circuit with logical information being applied thereto will now be described. As stated previously, for purposes of illustration the logical "0" and "1" are both of positive potential with respect to ground, the logical "1" being more positive than the logical "0." However, the level of the "0" is not sufficiently positive to drive the transistors into conduction.

It will be assumed that the arrangement for providing inputs to terminals 10 is similar to the driving arrangement for the second logical block in the embodiment of FIGURE 2. By this, it is meant that when a "0" is present on an input terminal 10, a very low resistance path exists between this terminal and ground. This would be electrically similar to the path from input terminals 10′ through output terminals 26, diodes 24*a* and 24*b*, and transistors 22*a* and 22*b* when the latter are conducting.

When "0's" are supplied to terminals 10, the diodes 14*a* and 14*b* are no longer forward biased, and current flow through the emitter-base circuits of transistors 22*a* and 22*b* ceases. This lowers the potential at the bases cutting off the transistors 22*a* and 22*b*. As these transistors cease to conduct, their collector potentials rise reverse biasing diodes 24*a* and 24*b*. This interrupts current flow from the positive source through resistors 16*c* and 16*d* and these diodes, thereby raising the potentials of the anodes of diodes 24*a* and 24*b* to produce "1's" by the AND function at the output terminals 26. The application of logical "1's" to the inputs of the OR circuits 12*c* and 12*d* produces "1's" at the outputs thereof which are coupled to the bases of transistors 22*c* and 22*d* respectively to drive these transistors into conduction thereby dropping their collector potentials. The AND gates 30′ are accordingly not conditioned and "0's" appear at the output terminals 26′.

When one or more "1's" are applied to input terminals 10, the reverse conditions occur. The OR gates 12*a* and 12*b* produce "1's" at their outputs which drive transistors 22*a* and 22*b* into conduction thereby producing "0's" at their collectors. This results in a failure to condition AND gates 30 thus causing "0's" to be present at output terminals 26. These "0's" are applied to the second logical block. The outputs of OR gates 12*c* and 12*d* are "0's" causing transistors 22*c* and 22*d* to cut off thereby producing "1's" at their collectors which condition and AND gates 30′ to produce logical "1's" at output terminals 26′.

Now that the operation of the system has been described when the system is functioning properly, the arrangement will be described with reference to operation when there are faults in the system to illustrate the usefulness of the redundancy provisions. It will be assumed that the difficulties encountered will result from component failures rather than those occasioned by faulty terminal connections or connecting lines. For the purposes of discussion, only one logical block will be considered. As stated previously, this block will perform a simple inversion of the logical input information.

For purposes of illustration an input will be applied to only one input terminal, and the various faults discussed will occur in the circuit between this selected input and the output terminals. It will be apparent that faults in the other circuits between the remaining inputs and the output terminals will have no effect on the operation of the channel which has been arbitrarily selected for illustration. It will further be assumed for convenience that the faults occur in the upper redundant path shown in the drawings.

With a logical "1" applied to one of the input terminals 10, a "0" should occur in normal operation at output terminals 26. Assuming first that the associated diode 14*a* open circuits, the OR condition of gate 12*a* is not achieved. Therefore, the base of transistor 22*a* is not driven positively and the transistor remains cut-off. A logical "1" is accordingly applied to one input of the AND gates 30. However, since the lower redundant path is operating properly, the "1" input drives transistor 22*b* into conduction producing a "0" at its collector. Since this information is a second input to each AND gate 30, none of the gates is conditioned. Therefore, a "0" output appears at all of the output terminals 26.

If in the above case, the resistor 16*a* in the selected channel opened, the voltage level at the anode of the diode created by the biasing through 16*a* would be absent thereby preventing the forward bias of the diode 14*a* required to drive the transistor 22*a* into conduction. Since transistor 22*a* remains cut-off, its input to AND gates 30 would be essentially a "1." However, the properly operating lower redundant path provides a "0" input to AND gates 30. This prevents the enabling of gates 30 producing a "0" on output terminals 26.

The failure of the coupling circuit (resistor 18*a* and condenser 20*a*) or transistor 22*a* would insure that the transistor produce a "1" output as conduction of the transistor would be prevented. However, so long as the other redundant path is operating correctly, only one of the inputs to each AND gate 30 would be conditioned with a "1" and the resultant outputs at terminals 26 would properly remain as "0's."

Of course, failure of one of the two diodes of the AND circuits 30 would not affect the output adversely since the gate would no longer require conditioning by two inputs and would respond only to the conditions on the diode in the properly operating redundant path.

Now considering the inverting operation when an "0" is applied to a faulty channel of a redundant path, it will first be assumed that the corresponding diode of the OR circuit is faulty. Since none of the diodes 14*a* conduct when "0's" are applied to the input terminals 10, the potential at the base of transistor 22*a* will not be affected, and the transistor will remain cut-off thereby producing a "1" at its collector which is applied to one of the two inputs of each AND gate 30. The correctly operating redundant path presents the other input of each AND gate with a "1" to thereby condition the gates producing "1's" at the output terminals 26.

Similarly, failure of the coupling circuit (resistor 18*a* and condenser 20*a*) and of the transistor 22*a* also prevents conduction of the transistor thereby maintaining a "1" at its output which properly conditions AND gates 30 to produce "1's" at output terminals 26.

For the same reasoning previously applied, the failure of diodes in the AND circuits and the biasing arrangement for the OR circuits does not disrupt the proper operation of the system.

Referring to FIGURE 1, to determine whether a particular path of the double level logic is functioning properly, a test program may be applied to the input terminals 10. This testing operation is facilitated by the arrangement whereby the transistors may be selectively connected to ground through ground select switches 32 and 34. During normal operation, the emitters of both transistors in each logic block are connected to ground. However, when it is desired to test the first of the pair of redundant paths, the switch is actuated to connect only the emitter of the selected path to ground thereby preventing operation of the second path. A program of logical "1's" is then applied to the input terminals 10 and voltage readings are taken at output terminals 26. If the selected path is operating correctly, logical "0's" will appear at the output terminals. The absence of "0's" at terminals 26 indicates a failure of a portion of the redundant path tested. Further conventional element testing procedures may then be utilized to localize the defective portions of the path.

Of course, more sophisticated arrangements for checking the outputs of a selected path could be employed to note the voltage levels at terminals 26 to determine if the path is operating correctly. For example, an electronic display or a print-out arrangement could be utilized with appropriate error detection circuitry to accomplish this purpose.

It will also be obvious that each of the redundant paths may be physically and electrically arranged such that on detection of a defective path, the test program may be removed from inputs 10, the biasing withdrawn from the defective path, and the ground switch actuated to place the other circuit in its operative condition permitting operation of the computer while the defective redundant path is removed to be substituted for by a replacement circuit.

Once again it should be noted that the system just disclosed is operable only to prevent the adverse effects of open-circuit failures, by far the most commonly experienced in data processing equipment.

The basic building block disclosed is a single inverting circuit. Such circuits may be combined with similar circuits in a number of ways to produce different logic devices. For example, a pair of inverters may be interconnected to fabricate a bistable multivibrator. Such a device is described in application Serial Number 233,778 filed on October 29, 1962 by James E. Thornton and Ernest J. Hood. Although the precise inverters differ, the operation of the device using the inverting arrangement herein disclosed would be basically the same.

The above-described embodiments are illustrative of preferred embodiments of the invention but are not intended to limit the possibilities of insuring the features of computer operation for long periods of time with high probability. The building block arrangements disclosed herein are examples in which the inventive features of this disclosure may be utilized and it will become apparent to one skilled in the art that certain modification may be made within the spirit of the invention as defined by the appended claims.

What is claimed is:

1. A logical building block for use in digital computers comprising a plurality of input terminals, a pair of logic paths connected to each of said input terminals, each of said logic paths comprising in series: an OR circuit, an inverter and at least one portion of an AND circuit; the portion of said AND circuit in said first logic path being combined with the portion of said AND circuit in the second path to complete said AND circuit, and an output terminal connected to the output of said completed AND circuit.

2. A logical building block as set forth in claim 1 wherein a plurality of portions of AND circuits are included in each logic path, portions of AND circuits in said first path being combined with corresponding portions of AND circuits in said second path to complete a plurality of AND circuits, and an output terminal connected to each output of the completed AND circuits.

3. A logical building block as set forth in claim 1 wherein each of said inverters comprises a transistor, said transistor having an emitter, a base and a collector, and means for selectively connecting said emitters to ground.

References Cited by the Examiner

UNITED STATES PATENTS

| | | | |
|---|---|---|---|
| 3,016,517 | 1/1962 | Salzberg | 307—88.5 |
| 3,069,562 | 12/1962 | Steele | 307—88.5 |
| 3,116,477 | 12/1963 | Bradbury | 307—88.5 |

FOREIGN PATENTS

| | | |
|---|---|---|
| 809,669 | 2/1959 | Great Britain. |

OTHER REFERENCES

Control Engineering, the Versatile Transistor Nor Circuit, May 1960, Albert Desautels, pp. 101–104.

ARTHUR GAUSS, *Primary Examiner.*

B. P. DAVIS, *Assistant Examiner.*